Nov. 4, 1952 P. J. TOWNSEND 2,616,548
CALCULATING AND SIMILAR ACCOUNTING MACHINE
Filed Dec. 29, 1949 2 SHEETS—SHEET 1

FIG. 1

INVENTOR
PERCIVAL JOHN TOWNSEND

BY Earl Beust
Justin S. Lowston

HIS ATTORNEYS

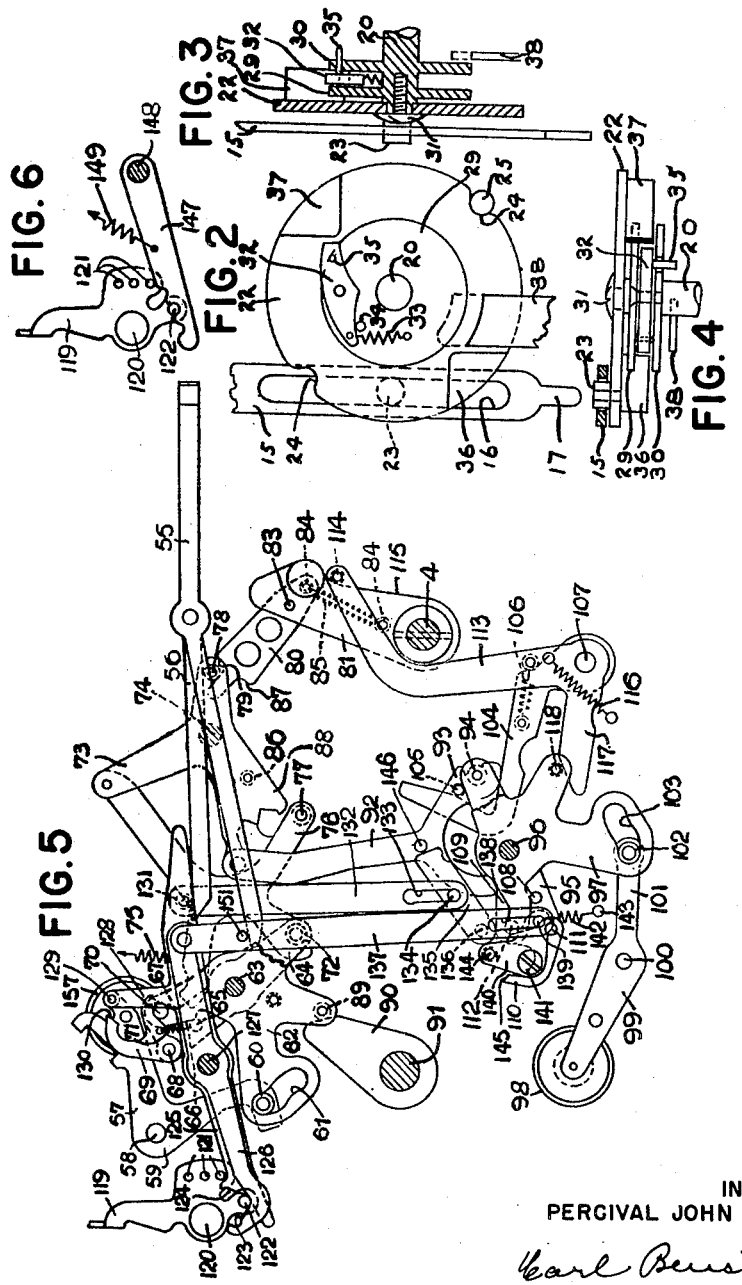

Patented Nov. 4, 1952

UNITED STATES PATENT OFFICE 2,616,548

CALCULATING AND SIMILAR ACCOUNTING MACHINE

Percival John Townsend, Thornton Heath, England, assignor to The National Cash Register Company, Dayton, Ohio, a corporation of Maryland Application December 29, 1949, Serial No. 135,783
In Great Britain January 31, 1949

3 Claims. (Cl. 197—176)

This invention relates to calculating machines and similar accounting machines of the kind having a travelling carriage which may be moved to align any one of a number of columns of a record sheet with printing type which is adjustable in accordance with entries made in the machine, and is more particularly concerned with improvements in mechanism for controlling the carriage movements, and for line-spacing the carriage platen when desired.

Although the present invention finds particular use in connection with adding machines, and will be mainly referred to hereinafter as being applied to such machines, it is to be fully understood that it is applicable to any kind of calculating or accounting machine having a travelling carriage.

In known kinds of adding machines, which have been mainly provided for the purpose of straight listing work, entries are made seriatim in a single column, the record sheet being line-spaced between each entry. Where, however, it is required that consecutive entries be made on the same line but in different columns, the operation is difficult inasmuch as, not only has the carriage to be tabulated by manual means, but also the record sheet has to be back-spaced by one line after each entry, because of the automatic operation of the line-spacing mechanism at each machine operation.

The present invention has for its object to provide, in addition to straight-forward listing operations with platen line-spacing after each entry, arrangements for automatically controlling tabulation of the carriage between columns, with line-spacing of the platen only at each alternate columnar entry.

According to one aspect the invention comprises a calculating or similar accounting machine, including a travelling record material carriage, a main operating mechanism, a carriage shuttling mechanism adapted to shuttle the carriage automatically between two columnar positions, a clutch device intermediate said main operating mechanism and the shuttling mechanism, and control mechanism for the clutch adapted to cause it either to clutch the shuttling mechanism to the main operating mechanism to shuttle the carriage at each machine operation, or to unclutch the shuttling mechanism from the main operating mechanism to permit the carriage to remain stationary during each machine operation.

According to another aspect, the invention comprises a calculating or similar accounting machine, including a travelling record material carriage, a platen and line-spacing mechanism therefor, operating mechanism for the line-spacing mechanism, an automatically operable carriage shuttling mechanism adapted to shuttle the carriage between two columnar positions and directly to prevent or permit operation of the line-spacing mechanism by its operating mechanism, in dependence upon the columnar position to which the carriage has been shuttled, and a manually operable device adapted to disable the carriage shuttling mechanism and to disable the operative connection between said shuttling mechanism and the operating mechanism for the line-spacing mechanism, whereby the latter is effective to line-space the platen at every machine operation.

In a preferred embodiment the carriage is arranged to be shuttled directly from the main driving mechanism of the machine.

The above, and other subsidiary features of the present invention as applied, by way of example, to one manner of carrying it into effect as applied to an adding machine, will now be described with reference to the accompanying drawings.

In the drawings:

Fig. 1 is a general perspective view of the carriage shuttling and line-spacing mechanism, as seen from the rear of the machine.

Fig. 2 shows a full view of a clutch device for clutching the carriage shuttling mechanism to, and unclutching it from the main operating mechanism.

Fig. 3 is a side view of the clutch device, partly in section.

Fig. 4 is a plan view of the clutch device.

Fig. 5 is a side view of the totalizer engaging and disengaging control mechanism.

Fig. 6 is a detail view of an aligning device for the manually operable totalizer selecting lever.

The machine to which the present invention is shown as applied, by way of example only, is of a well-known type of adding machine, such as disclosed, for instance, in United States Patent No. 2,428,084, issued to Harry L. Lambert on September 30, 1947, and in the co-pending United States application of Harry L. Lambert, Serial No. 586,359, filed April 3, 1945, and only a brief reference will be made herein to such of the known mechanisms as is necessary to an understanding of the present invention.

In general, the machine comprises a keyboard, an upper totalizer and a lower totalizer, control devices for selectively controlling the totalizers to perform additive, subtractive, non-additive, sub-total-taking, and total-taking operations, a printing mechanism, and a record material carriage which is normally arranged to be moved manually into, and out of, any desired columnar position, in certain types of machine operations. In other types of machine operations, as will be explained later in this description, the arrangements of the present invention provide means whereby, at the will of the operator, the carriage can either be automatically shuttled backwards and forwards between desired adjacent columnar positions, with line-spacing of the platen after each alternate movement of the carriage, or the carriage can be conditioned to remain stationary in a particular columnar position, the line-spacing mechanism operating at each consecutive machine operation with the carriage in this position.

A more detailed description of the various mechanisms will now be given.

*Carriage shuttling mechanism*

The various mechanisms comprised in the present machine are supported by a right-side frame 1 (Fig. 1) and a left-hand side frame 2, connected by a cross frame 3, the positions of the frames being considered with respect to the front of the machine.

A cam shaft 4 (Figs. 1 and 5), journalled in the frames 1 and 2, is adapted to be reciprocated in known manner at each machine operation.

A record material carriage 5 (Fig. 1) supports a platen (not shown) which is adapted to be line-spaced under control of a feed bail 6, which is adapted to be reciprocated when line-spacing is required.

Mounted on a rod 7, extending between side frames of the carriage 5, is a locking finger 8. The rod 7 is rockable by means of a manually operable lever 9, so as to disable the locking finger 8 to permit the carriage 5 to be moved manually to any desired columnar position.

A bar 10 is slidably mounted on two studs 12 passing through elongated slots in said bar and secured to the rear of the carriage 5.

Secured to the bar 10 is a usual stop bar 13 adapted to support adjustable stop lugs 14 which cooperate with the finger 8 to locate the carriage in any desired columnar position.

The slide bar 10 has integral therewith a depending arm 15 (Figs. 1, 2, 3 and 4) having a longitudinal slot 16 therein and terminating in a reduced nose portion 17.

Adjustably secured to the stop bar 13, in any desired columnar position or positions, are totalizer selecting stops 18.

Fast on the left-hand end of the cam shaft 4 is a helical gear segment 218 meshing with another similar helical gear 19 secured on a stub shaft 20 (Figs. 1, 2, 3 and 4) supported within a solid rectangular framework 21 secured to an upward inverted L-shaped extension of the cross frame 3 (Fig. 1), the end of the horizontal limb of the extension being secured to the side frame 1.

Freely mounted on a reduced end of the stub shaft 20 (Figs. 1, 2, 3 and 4) is a plate 22 having mounted thereon a roller 23 which engages in the slot 16 (Figs. 1 and 2) of the arm 15.

Formed in the periphery of the plate 22 (Figs. 1 and 2) are diametrically opposed cam notches 24, having sloping cam sides, which cooperate with a roller 25 on a bell crank 26 pivoted on a screw 27 secured in the cross frame 3. The roller 25 is maintained in contact with the periphery of the plate 22 by means of a spring 28.

The plate 22 is adapted to be driven 180 degrees clockwise, as seen in Fig. 2, by the gears 19 and 218, at each operation of the cam shaft 4, the roller 25 serving to locate said plate in each new position. The arrangement is such that the positive drive from the shaft 4 ceases just prior to the full 180 degrees movement of the plate 22, the full movement of the latter being completed by the pressure of the roller 25 on the cam face of the appropriate notch 24.

Fast on the shaft 20 (Figs. 3 and 4) is a pair of discs 29 and 30. The plate 22 is located on a reduced portion of the shaft 20 by a screw 31.

Pivoted on a pin secured between the discs 29 and 30 is a pawl 32 urged counter-clockwise, as seen in Fig. 2, by means of a spring 33, said counter-clockwise movement being limited by a pin 34 secured between the discs 29 and 30.

In order to permit a limited clockwise movement of the pawl 32 the latter has fast thereon a pin 35 which cooperates with a notch in the periphery of the disc 30, as clearly indicated in Fig. 4. The pawl 32 terminates in an abrupt surface (Fig. 2) which is adapted to cooperate seriatim with each of a pair of blocks 36 and 37 secured to the plate 22.

As viewed in Fig. 2, the discs 29 and 30, and the pawl 32, are driven by the shaft 20, 180 degrees counter-clockwise, the pawl 32, during this movement, by-passing the block 36 and coming to rest with its abrupt surface spaced somewhat to the right of said block, as determined by the co-operation of the roller 25 with the notch 24. On the return movement clockwise of 180 degrees of the shaft 20, the discs 29 and 30 return to their original positions, as shown in Fig. 2, the abrupt surface of the pawl 32 contacting the right-hand face of the block 36 during this movement to rotate the plate 22 also 180 degrees in a clockwise direction, the roller 25, in cooperation with the other notch 24, completing this movement of the plate 22.

From the foregoing it will be seen that the plate 22, through the roller 23, will move the arm 15 alternately to the right and then to the left, as viewed in Fig. 2. Since the arm 15 is secured to the bar 10, which is fast on the rack 13 to which the carriage 5 is coupled by the finger 8 and the lug 14, the carriage 5 will be shuttled backwards and forwards between adjacent columnar positions.

By rocking the lever 9 (Fig. 1) and moving the carriage 5 manually either to the right or to the left, and then releasing the lever 9 so that the finger 8 re-engages a selected lug 14, the carriage 5 can be arranged to shuttle automatically between any two desired adjacent columnar positions.

*Manual control of shuttle mechanism*

The present invention provides means whereby, at the will of the operator, by manipulation of a hand lever the carriage can be adapted either automatically to shuttle between two adjacent columns, with line-spacing of the platen at each alternate columnar movement, or can remain stationary in a desired columnar position with line-spacing of the platen at every consecutive machine operation. This control mechanism will now be described.

A slide 38 (Figs. 1, 2, 3 and 4) is mounted by means of elongated slots therein (see Fig. 1), for vertical reciprocation, on screws secured in the cross frame 3. This slide 38 is coplanar with the right-hand end of the pin 35 of the pawl 32, as shown in Figs. 3 and 4, and has an upper cam surface adapted, when the slide 38 is in its upper position, to cooperate with the pin 35.

Pivotally connected to a projection on the slide 38 is a manually operable lever 39, also pivoted on the cross frame 3.

The lever 39 has two positions of adjustment, one as shown in Fig. 1, and the other being a counter-clockwise position. A cabinet (not shown) for the machine may have suitable apertures into which the lever can be sprung to locate it in adjusted position. In the position shown in Fig. 1, the lever 39 permits the carriage automatically to shuttle, with line-spacing at each alternate columnar movement, and, when said lever is in its other positions, the shuttling mechanism is disabled, and the line-spacing mechanism will function at every machine operation.

When the lever 39 is in the position shown in Fig. 1, the top end of the slide is located in the position shown in full lines in Fig. 2, i. e. wherein its cam surface is out of the path of movement of the pin 35 on the pawl 32. Thus the automatic shuttling mechanism will be conditioned to operate.

When the lever 39 is rocked to its counter-clockwise position, the slide 38 is raised to the position shown in chain lines in Fig. 2, and the cam surface thereon is in the path of the pin 35. Now, when the discs 29 and 30 are rocked 180 degrees counter-clockwise by the shaft 20, and the pin 35, contacting the cam surface on the slide 38, will be rocked clockwise, entering the notch in the disc 30 at this time. In this position of the pawl 32, its abrupt surface is out of the path of the block 36.

The cam surface on the slide 38 maintains the pawl 32 in its clockwise position, during the clockwise return movement of the discs 29 and 30, until after the abrupt surface on the pawl has passed beyond the block 36. Thus the plate 22 will not be driven by the pawl 32 and the carriage 5 (Fig. 1) will remain in the columnar position it occupied at the commencement of the machine operation. Since the notches on the rotatable member are sloped the carriage may be manually moved to any desired position by sufficient force to dislodge the roller detent.

Therefore it will be seen that, when the lever 39 is in its lower, or counter-clockwise, position, the automatic shuttling mechanism is disabled.

*Platen line-spacing control mechanism*

The manually operable lever 39 (Fig. 1), as already stated, is also adapted to control the operation of the platen line-spacing mechanism, and this control mechanism will now be explained in more detail.

Reciprocating movement is imparted to the bail 6, in order to line-space the platen, by means of a pivoted operating lever 53 bearing a roller with which the bail 6 cooperates under the influence of a torsion spring. The lever 53 cooperates with a roller carried by a cam 54 fast on the cam shaft 4.

When the cam 54 rotates counter-clockwise, the lever 53 follows it and then, when the cam 54 returns clockwise, the roller thereon positively rocks the lever 53 also clockwise, rocking the bail 6 to operate the usual ratchet and pawl platen line-spacing mechanism.

A pair of slides 43 and 44 is mounted for horizontal sliding movement on the screw 27 and on a similar screw secured on the cross frame 3, by means of slots in said slides.

The slides 43 and 44 are normally coupled for unitary movement by means of a coupling arm 49 pivoted on the slide 43 and having a pin 50 engaging with a notch in the slide 44.

The slides 43 and 44 are connected for sliding movement relatively to each other, by means of headed pins 45 passing through an elongated slot 46 in the slide 43, and secured in the slide 44.

The slide 43 carries a pair of spaced studs 47, one on each side of the reduced foot 17 of the arm 15, and a plate 48 is secured between the other ends of the studs, the face of the slide 43 and the plate 48 forming a guideway for the horizontal reciprocating movements of the arm 15. The spacing of the studs 47 is such that the foot 17 contacts them alternately, during shuttling operations, just before said foot completes its movement in either direction. Thus the foot 17, when the slides 43 and 44 are coupled by the arm 49, will impart a limited reciprocation to the slides 43 and 44.

A torsion spring 49 normally maintains the stud 50 in position to couple the slides.

The slide 44 has a projection 52 normally located just to the right of the line-spacing lever 53.

When the slides 43 and 44 are coupled for unitary movement, and the lever 39 is set to shuttling position, as shown in Fig. 1, the carriage 5 is located so that, as seen from the front of the machine, a right-hand one of a pair of adjacent columns on a record material inserted around the platen is located opposite the printing type members (not shown). At this time, since the projection 52 is out of the path of the lever 53, the latter will be free to follow the cam 54 during its counter-clockwise movement. Then, when the cam 54 returns clockwise, the roller thereon contacts the lever 53, rocking it clockwise to rock the bail 6 counterclockwise to cause line-spacing of the platen and the record material.

It is as well to state here that the inter-relationship of the helical gears 19 and 218 is such that printing takes place before the carriage 5 is shuttled to the left-hand column of the record material.

The pawl 32 now becomes effective, as above described, to shuttle the carriage 5 to the left-hand columnar position. At this time, the foot 17 of the arm 15, moving to the left, as seen in Fig. 1, under the influence of the roller 23, contacts the left-hand stud 47 in the slide 43, camming the slides 43 and 44 to the left. This positions the extension 52 on the slide 44 in the path of the line-spacing lever 53.

During the ensuing machine operation, when a print is made in the left-hand column of the record material, the lever 53, being held by the projection 52, cannot follow the cam 54 in its counter-clockwise movement and therefore, when the cam 54 returns clockwise, it will not rock said cam lever 53, and the line-spacing mechanism will not be operated.

At the next shuttling movement of the carriage 5 to the right-hand column, the foot 17 of the arm 15 will contact the righthand stud 47, moving the slides 43 and 44 to the right, again removing the projection 52 from the path of the line-spacing lever 53 which, after a print has been made in said right-hand column, will be free to follow the cam 54, and thus the record material will be line-spaced after this print.

If it is desired that the line-spacing mechanism shall operate at every machine operation, whilst the carriage remains stationary, in order to make a succession of line-spaced prints, all in the same column of the record material, the lever 39 is depressed to its counter-clockwise position. As above stated, this disables the pawl 32. In addition this movement of the lever 39 uncouples the slides 43 and 44, by the following means, positively to ensure that the line-spacing mechanism shall operate at every machine operation whilst the lever 39 is in this lower, or listing, position.

A cam surface 51 is formed on the foot of the slide 38 and cooperates with a nose on the coupling arm 49. When the lever 39 is rocked counter-clockwise and raises the slide 36, the camming surface 51 rocks the arm 49 clockwise, thus removing the stud 50 from the notch in the slide 44, thus uncoupling the slides.

If, at this time, the arm 15 is in its left-hand position, i. e. if the roller 23 is 180 degrees away from the position shown in Fig. 1, the removal of the stud 50 from the notch in the slide 44 will permit a spring 168 to pull the slide 44 to its extreme right-hand position wherein the projection 52 is well out of the path of the line-spacing lever 53, and therefore line-spacing will occur at every machine operation, whilst the carriage 5 remains stationary in the same columnar position.

If the lever 39 is now moved clockwise to shuttling position, the movement of the arm 15 to the right, by the roller 23, will cause the foot 17 to contact the right-hand stud 47, moving the slide 43 to the right, at the end of which movement the stud 50, under the influence of the spring, will snap into the notch in the slide 44, re-coupling the slides so that line-spacing will once again occur at each alternate columnar position occupied by the carriage.

*Totalizer engaging and disengaging mechanism*

As stated above, the machine to which the present invention is shown as applied, by way of example only, is equipped with an upper totalizer and a lower totalizer.

The arrangement is such that the totalizers are left in engagement with the usual actuators at the end of each machine operation, are disengaged therefrom at the commencement of each machine operation during the time that the actuators are being set under control of depressed item-entering keys, and are selectively re-engaged with the actuators whilst the latter are restored to home position. The totalizer selecting mechanism will be described later.

The engaging and disengaging mechanism for the upper totalizer will now be briefly described, reference being directed to the co-pending United States application of Harry L. Lambert, Serial No. 586,359, for a more complete description.

*Totalizer engaging and disengaging mechanism— upper totalizer*

Referring to Fig. 5, the totalizer 157 is supported by a pair of arms 57, only one of which is shown, pivotally mounted at 58. The arm 57 has an integral arm 59 carrying a roller 60 which engages in a cam slot 61 in a totalizer engaging lever 62 pivotally mounted on a stud 63 supported by the right side machine frame 1 (Fig. 1). Pivoted on the stud 63 (Fig. 5), adjacent the totalizer engaging lever 62, is a lever 64 having a pin 65 contacting a surface 66 of the lever 62.

The upper end of the lever 64 carries a stud 68 on which is pivoted a coupling pawl 69 held in engagement with a stud 70 on the totalizer engaging lever 62 by a spring 71.

The lower arm of the lever 64 has a stud 72 which is engaged by the bifurcated end of a pitman 76, said pitman being pivoted to the upper end of a bell crank 73 pivoted on a stud 74 mounted in the machine right side frame.

The bifurcated end of the pitman 76 is held in engagement with the stud 72, against the tension of a spring 75, by means of the usual total-taking control mechanism.

Another arm of the bell crank 73 carries a stud 78 which cooperates with a shoulder 79 on one member 80 of a toggle 80, 81. The member 81 is fast on the cam shaft 4 (Figs. 1 and 5) reciprocated in known manner at each machine operation. The member 80 (Fig. 5) is pivoted on the member 81 at 83 and the two members are flexibly coupled by means of a spring 85 anchored on pins 84. This spring 85 serves to maintain the engagement of the shoulder 79 and the stud 78.

The coupling pawl 69 is normally conditioned to effect the before-mentioned re-engagement of the totalizer 157 with the actuators during the restoration of the latter, and, under these conditions, the operation of the parts is as follows.

The shaft 4 receives first a counter-clockwise movement, as seen in Fig. 5, and then a clockwise return movement. When the shaft 4 rocks counter-clockwise, the toggle arm 81 rocks similarly, carrying with it the member 80, the shoulder 79 of which contacts the stud 78 and causes the bell crank 73 to rotate counter-clockwise until the arm 81 and member 80 reach a position of alignment, in which position the spring 85 lies substantially parallel to the common axis, tending to hold them in this position. This rocking of the bell crank 73 moves the pitman 76 to the left, as seen in this figure, rocking the lever 64 clockwise on its pivot 63, whereupon the pin 65, through its engagement with the surface 66, rocks the totalizer engaging lever 62 also clockwise. The cam slot 61, cooperating with the roller 60, rocks the arm 57 counter-clockwise to disengage the totalizer 157 from the actuators (not shown).

On the continued counter-clockwise movement of the shaft 4, and prior to the restoration of the actuators to home position, the arm 81 and member 80 continue to move in alignment, and, prior to the end of the movement, the shoulder 87 of the member 80 engages a stud 86 on a downwardly extending arm 88 of the pitman 76 causing the arm 80 to ride over the dead centre towards the right in a clockwise movement about pivot 83.

On the return clockwise movement of the shaft 4, the toggle formed by arm 81 and the member 80 is again straightened and the consequent raising of the shoulder 87 against the stud 86 causes the bell crank 73 to rotate clockwise, which, in turn, moves the pitman 76 to the right and the lever 64 counter-clockwise to normal position, whereupon the coupling pawl 69, through its engagement with the stud 70, rocks the totalizer engaging lever 62 counter-clockwise to its normal position, and the cam slot 61 rocks the totalizer arm 57 clockwise, again engaging the totalizer 157 with the actuators.

After the toggle formed by arm 81 and member 80 is straightened, the shoulder 87 leaves the stud 86 and continues to move until the shoulder 79 again engages the stud 78 whereupon the line of the toggle is broken on the continued movement of the arm 81 and the parts are eventually restored to the positions shown in Fig. 5.

In case the pawl 69 should not restore the engaging lever 62 fully to its counter-clockwise position as shown in Fig. 5, this restoration is assisted by an arm 90 fast on a main shaft 91. This arm 90 is rocked first counter-clockwise and then clockwise at each machine operation, and, if the engaging lever 62 should not have been fully restored, the arm 90, in its return movement clockwise, contacts a stud 89 on said lever positively to restore the latter fully to home position.

If the totalizer engaging lever 62 has been fully restored, then the arm 90 will merely move idly clockwise until it just rests against the stud 89, as shown in Fig. 5.

In order to locate the parts in either of their two positions of adjustment, the usual pawl (not shown) is provided, which cooperates with locating notches in the downward extension 88 of the bell crank 73.

The totalizer engaging lever 62 also carries locating notches on a projecting arm, which has been broken away in Fig. 5 in order to show the lever 64, cooperating with a pawl (not shown).

The timing of the engaging and disengaging movements of the totalizer 157, described above, relates to adding and subtracting operations; the manner in which the timing is altered for sub-total and total-taking operations is not relevant to the present invention, and is fully disclosed in the before-mentioned co-pending United States application of Harry L. Lambert, Serial No. 586,359.

The engaging and disengaging mechanism for the lower totalizer will now be described.

*Engaging and disengaging mechanism for the lower totalizer*

Pivotally connected to the arm 88 of the bell crank 73 is an inverted Y-shaped pitman 92, one fork 93 of which is bifurcated to embrace a stud 94 on a lever 95 pivoted on a stud 96 in the right side machine frame 1 (Fig. 1).

The bifurcated end of the fork 93 (Fig. 5) of the pitman 92 is held in engagement with the stud 94 in the lever 95 by a lever 104 cooperating with a stud 105 on the fork 93, under the influence of a spring 106. The lever 104 is pivoted on a stud 107 in the right side machine frame. The lever 104 is controllable in sub-total and total-taking operations in known manner.

Pivoted on the stud 96, adjacent the lever 95, is an engaging lever 97 for a lower totalizer 98. The totalizer is supported by a pair of arms, only one of which, 99, is shown, pivoted on a shaft 100 in the right side machine frame.

An extension 101 of the arm 99 carries a roller 102 engaging in a cam slot 103 in the totalizer engaging lever 97.

The lever 95 carries a stud 108 cooperating with a surface on an arm 109 of the totalizer engaging lever 97.

A pawl 110, pivotally mounted on a pin 111 on the lever 95, normally engages a stud 112 on the engaging lever 97, under the influence of a spring (not shown).

Pivotally mounted on the stud 107 is a restoring lever 113, a pin 114 on which is normally held in contact with a surface 115 on the toggle member 81 under the influence of a spring 116.

With the parts positioned as shown in Fig. 5, their operation is as follows:

As the bell crank 73 is rocked counter-clockwise as described above, the pitman 92 is shifted downwardly, as seen in this figure, whereupon the fork 93, cooperating with the stud 94, rocks the lever 95 clockwise, causing the stud 108 similarly to rock the totalizer engaging lever 97. Through the cam slot 103, and the roller 102, the arm 99 is rocked counter-clockwise to move the totalizer 98 from its normal engaged position, out of engagement with the actuators.

The actuators are now set to positions commensurate with the amount represented by operated item-entering keys.

Prior to the restoration of the actuators to home positions, the bell crank 73 is rocked clockwise, as above described, whereupon the pitman 92 is restored upwardly, rocking the lever 95 counter-clockwise. The pawl 110, by its cooperation with the stud 112, rocks the totalizer engaging lever 97 counter-clockwise at this time, causing the arm 99 to be rocked clockwise to re-engage the lower totalizer 98 with the actuators.

The actuators are now reset so as to enter the amount set up on the keys into the totalizer 98.

In case the pawl 110 does not fully restore the totalizer engaging lever 97, the lever 113 is effective to do so, as follows. When the member 81 moves counter-clockwise, the lever 113 follows it under the influence of the spring 116. When the member 81 returns clockwise, its surface 115 contacts the stud 114, positively restoring the lever 113 clockwise.

If the engaging lever 97 has not been fully restored by the pawl 110, an extension 117 on the lever 113 will engage a stud 118 on said engaging lever, as the lever 113 rocks clockwise, positively restoring the totalizer engaging lever 97 to the position shown in Fig. 5.

If the pawl 110 has fully restored the engaging lever 97, the extension 117 will idly follow the stud 118 until it just rests thereagainst, as shown in Fig. 5, at the end of the machine operation.

The manually operable totalizer selecting mechanism will now be described.

*Manual totalizer selecting mechanism*

The two totalizers are selectable under control of a manually operable lever 119 (Figs. 5 and 6), which has three positions of adjustment. Since both totalizers are normally selected for engagement, as described above, selection of either of them for independent operation is accomplished by disabling the engaging control pawl 69 or 110 (Fig. 5) for the other totalizer.

When the lever 119 is in its extreme clockwise position, it disables the pawl 110 for the lower totalizer 98, and therefore selects the upper totalizer 157 for engagement; when the lever 119 is in its central position, as shown in Fig. 5 and Fig. 6, both pawls 69 and 110 are effective to select their related totalizers; when the lever 119 is in its counter-clockwise position, the selecting pawl 69 for the upper totalizer 157 is disabled, and therefore the lower totalizer 98 is selected for engagement with the actuators.

The above mechanism will not be described in detail.

The selecting lever 119 (Figs. 5 and 6) is pivotally mounted on a stud 120 in the machine right side frame 1 (Fig. 1), and has three locating holes 121 (Figs. 5 and 6) in a rear extension, a related one of which is adapted to be engaged, in known manner, by a slide (not shown), which is reciprocated during each machine operation, so as to locate the lever 119, and also to prevent machine operation if said lever is intermediate any of its positions of adjustment.

A stud 122 on a foot of the lever 119 is adapted to cooperate with cam surfaces 123 and 124 (Fig. 5), respectively, on a disabling lever 125 for the upper totalizer 157, and a disabling lever 126 for the lower totalizer 98.

The levers 125 and 126 are freely mounted on a stud 127 secured to the machine right side frame 1 (Fig. 1).

The lever 125 has an upwardly extending finger 128 having a stud 129 therein adapted to cooperate with a cam surface 130 on the pawl 69. The rear end of the lever 125 is coupled by a sleeve 131 to a link 132, having a slot 133 in the lower end thereof engaged by a stud 134 on a total-taking locating arm 135 pivoted on a stud 136 in the frame 1 (Fig. 1).

The right-hand end of the disabling lever 126 (Fig. 5) has pivoted thereto the upper end of a link 137, the lower end of which has a slot 138 engaged by a stud 139 in a bell crank 140 pivoted on a screw stud 141 secured in the frame 1 (Fig. 1).

Anchored to the stud 139 is one end of a spring 142, the other end of which is secured to a stud 143 in the frame 1 (Fig. 1).

The bell crank 140 (Fig. 5) carries a stud 144 which is adapted to cooperate with a cam surface 145 on the pawl 110.

The upper totalizer 157 is selected for operation in the following manner.

The operator moves the lever 119 to its extreme clockwise position, whereupon the stud 122, co-operating with the cam surface 123 on the disabling lever 126, rocks the latter counter-clockwise, raising the link 137 and, through the slot 138 and the stud 139, rocking the bell crank 140 counter-clockwise to be positioned in the path of the cam surface 145 of the pawl 110.

When the bell crank 73 makes its initial counter-clockwise movement, and the lever 95 rocks clockwise, as previously described, the surface 145 of the pawl 110 engages the stud 144 thereby to rotate the pawl 110 counter-clockwise on its stud 111, thereby to remove the hook on the pawl out of engagement with the stud 112 on the lower totalizer engaging lever 97. On the return counter-clockwise movement of the lever 95 the pawl 110 will be held out of engagement with the stud 112 so that the totalizer engaging lever 97 will remain in its clockwise position and the totalizer 98 will thus not be re-engaged with the actuators.

The upper totalizer 157, however, whose pawl 69 has remained in normal position, will be engaged with the actuators for an amount to be entered thereinto on the return of the latter.

The lower totalizer 98 is selected alone for operation in the following manner.

The operator moves the lever 119 to its extreme counter-clockwise position, whereupon the stud 122, cooperating with the cam surface 124 on the disabling lever 125, rocks the latter counter-clockwise. This causes the stud 129 to be positioned in the path of the cam surface 130 on the pawl 69.

When the bell crank 73 makes its initial counter-clockwise movement and the lever 64 its clockwise movement, as already described, the cam surface 130 on said pawl, co-operating with the stud 129, which now lies in its path, causes the pawl 69 to rock counter-clockwise on its stud 68 relatively to the lever 64, disengaging the hook on the pawl 69 from the stud 70 in the engaging lever 62 for the upper totalizer 157. On the following counter-clockwise return movement of the lever 64, the hook on the pawl 69 by-passes the stud 70 on the engaging lever 62 so that the latter remains in its extreme clockwise position with the upper totalizer 157 out of engagement with the actuators during the return movement of the latter.

The lower totalizer 98, however, whose pawl 110 remains in normal position at this time, will be engaged.

The slot 133 in the link 132 permits the arm 135 to rock idly back and forth so as not to obstruct the upward and downward movement of the pitman 92.

The arm 135 is operative during a sub-total or total-taking operation on the upper totalizer 157, whereby, after the lever 104 is rocked counter-clockwise, as previously described, and the lower totalizer 98 has been disengaged from the actuators by the lowering of the pitman 92, the pitman is moved towards the left to disengage the bifurcated end thereof from the stud 94 and also to engage the stud 146 with the notch in the arm 135 to hold the pitman in this position during total-taking operations. The arm 135 is disengaged from the stud 146 after the operation is complete, in known manner, and is therefore not shown.

In Fig. 6 is shown an additional locating device for the lever 119, comprising a pawl 147 pivoted on a stud 148 in the machine frame 1 (Fig. 1). A spring 149 urges the pawl 147 clockwise so as to maintain an appropriate one of a series of notches therein in cooperative relationship with the stud 122 to locate the lever 119 accurately in any one of its three positions of adjustment. This additional locating lever 119 is used in connection with the automatic totalizer selecting mechanism now to be described.

*Automatic, or carriage-controlled totalizer selection*

In addition to being selectable by means of the manually operable lever 57 (Fig. 5), the totalizers 98 and 157 may also be selected automatically under control of the carriage 5 (Fig. 1) in accordance with the columnar position occupied by the latter, by the following mechanism.

Pivotally mounted on a screw in the machine right side frame 1 (Fig. 1) are two totalizers selecting levers 55 and 56 (Figs. 1 and 5), carrying rollers 150 (Fig. 1) adapted to cooperate with the adjustable stop 18.

The forward end of the lever 56 underlies the sleeve 131 coupling the disabling lever 125 for the upper totalizer 157 and the link 132, and the forward end of the lever 55 underlies a stud 151 on the link 137, said link being coupled, as previously stated, to the pin 139 of the bell crank 140 for the lower totalizer 98.

From the foregoing it will be clear that, when either of the rollers 150 is contacted by the stop 18, the associated selecting lever 55 or 56 will be rocked clockwise, the lever 55 lifting the link 137 to render the lower totalizer 98 non-additive and incidentally rotating disabling lever 125 counter-clockwise, whereas the lever 56 causes counter-clockwise rotation of the disabling lever 125 to render the upper totalizer 157 non-additive.

The before-mentioned aligning pawl 147 serves to prevent the lever 119 from floating freely on its pivot when either of the levers 125 or 126 has been removed from cooperation with the stud 122 under control of the carriage stop 18.

The following controls are possible by a suitable arrangement of stops 18 in appropriate columnar positions on the rack 13:

(1) The upper totalizer 157 can be additive and the lower totalizer 98 can be non-additive.

(2) The lower totalizer 98 can be additive and the upper totalizer 157 can be non-additive.

(3) Both totalizers 98 and 157 can be non-additive simultaneously.

(4) Both totalizers 98 and 157 can be additive simultaneously (by the omission of a stop 18).

*Examples of operation*

By way of example only, a brief description of two possible uses of the present invention will be given.

First, assuming that it is desired to enter non-additive items, such as reference numbers or invoice numbers, in the left-hand column of a record sheet, and to enter additive items, such as invoice amounts, in the right-hand column of the sheet.

Assuming the machine is positioned as illustrated in Fig. 1, the operator will first adjust the lug 14 (Fig. 1) in an appropriate position on the rack 13 corresponding to the right-hand column of the two columns in which printing is to occur.

Next he will slide the carriage 5 relatively to the rack 13 until the finger 8 snaps into the right-hand lug 14. This will locate the right-hand column of the record material opposite the printing members.

With the lever 39 in its upper, or shuttling position, as shown in Fig. 1, an idle cycle of machine operation is performed, whereupon the pawl 32 drives the plate 22 to cause the arm 15 to be moved to its left-hand position, so as to position the left-hand column of the record material opposite the printing members. He now adjusts another lug 14, which carries a stop 18, so that it is in position to depress both of the rollers 150.

The invoice number of the first item is now set up on the keyboard, and, when the machine is operated, this prints in the left-hand column of the record sheet. Since both the rollers 150 are depressed at this time, the recorded item will not be added into either of the totalizers, as the levers 55 and 56 have been rocked clockwise from the position shown in Fig. 5.

The carriage 5 now shuttles to its right-hand columnar position.

The platen will not be line-spaced because the slides 43 and 44 have been moved to the left to position the projection 52 in front of the line-spacing lever 53.

The amount of the invoice is now set up on the keyboard and, when the machine is released for operation, prints in the right-hand column of the record sheet.

Since there is no stop 18 above the rollers 150 at this time, the entered amount will be added into both totalizers.

When the carriage is in this position, the projection 52 is out of the path of the lever 53, and the platen is line-spaced, the carriage shuttling, before the machine operation is completed, again to present the left-hand column of the record sheet to the printing members.

The above operations are repeated until all the necessary entries have been made.

As a second example, assume that it is desired to list or add a series of items, all to be printed in the right-hand column of the record sheet.

The operator depresses the lever 39, disabling the shuttling mechanism and uncoupling the slides 43 and 44.

If the carriage 5 is in the position shown in Fig. 1, the projection 52 will already be out of the path of the line-spacing lever 53 but, if the carriage is in the left-hand columnar position, the downward movement of the lever 39 will uncouple the slides 43 and 44, whereupon the spring 168 will move the slide 44 to the right to remove the projection 52 from the path of the lever 53.

The first item is entered on the keyboard, the machine is released for operation, and the item is printed in the right-hand column of the record sheet.

The line-spacing mechanism operates, but, since the pawl 32 has been disabled by the cam surface at the top of the slide 38, the carriage 5 does not shuttle but remains in the same columnar position.

As neither of the rollers 150 is depressed at this time, the printed amount is added in both totalizers 98 and 157.

At each subsequent entry, whilst the lever 39 remains in its downward position, each entry will be printed in the right-hand column, line-spaced from the preceding entry, and added into both of the totalizers.

What is claimed is:

1. In a calculating machine the combination of a record material carriage slidably mounted so as to be movable to different columnar positions, said carriage having a member secured thereto which has a slot at right angles to the direction of carriage movement; a rotatable member mounted loosely on a shaft and having a pin projecting in said slot whereby on rotation of the rotatable member the carriage is moved from one extreme position to the other during a single rotation, and said rotatable member having two drive blocks and two positioning notches with sloping cam sides located 180° apart with reference to the rotational movement of the rotatable member; a roller which is spring-pressed against the rotatable member and adapted to fall into one or the other of the notches as the carriage in its movement reaches one or the other extremes of its movement; a drive means given a reciprocating movement during a machine operation, said drive means including a spring-pressed by-pass pawl which is moved back of one or the other of the drive blocks during the first half of the reciprocating movement and, unless prevented, engaging such drive block to move the rotatable member 180° during the second half of the reciprocating movement.

2. The device of claim 1 in which a manually operable means is provided which when operated holds the pawl from engaging either of the drive blocks, thus permitting the roller to maintain the carriage in one extreme position or the other during ensuing machine operations, but permitting manual movement of the carriage to any desired point.

3. The device of claim 1 in which the slotted member on the carriage is adjustable in the direction of movement of said carriage so that the extreme positions of automatic movement thereof may be selected.

PERCIVAL JOHN TOWNSEND.

REFERENCES CITED

The following references are of record in the file of this patent:

UNITED STATES PATENTS

| Number | Name | Date |
|---|---|---|
| 924,118 | Vincent et al. | June 8, 1909 |
| 980,652 | Mallmann et al. | Jan. 3, 1911 |
| 1,048,249 | White | Dec. 24, 1912 |
| 1,084,591 | Benner | Jan. 13, 1913 |
| 1,109,315 | Benner | Sept. 1, 1914 |
| 1,321,648 | Landsiedel | Nov. 11, 1919 |
| 1,344,191 | Teetor | June 22, 1920 |
| 1,368,424 | Briechle | Feb. 15, 1921 |